United States Patent [19]

Lowi, Jr. et al.

[11] 3,860,492

[45] Jan. 14, 1975

[54] LIQUID SEPARATION SYSTEM

[76] Inventors: Alvin Lowi, Jr., 2146 Toscanini Dr., San Pedro, Calif. 90732; Clifford C. Wright, 4638 Browndeer Ln., Palos Verdes Peninsula, Calif. 90274

[22] Filed: June 27, 1973

[21] Appl. No.: 374,211

[52] U.S. Cl. ............. 202/236, 159/1 W, 159/13 R, 203/70, 203/89, 203/49
[51] Int. Cl. ............. B01b, B01d 3/00, B01d 1/00, B01d 3/34, B01d 3/08
[58] Field of Search ........ 159/1 W, 4 K, 13 B, 28 P, 159/DIG. 28, 8, 47 R, 24 A, 13 C; 202/236; 203/49, 89, 10

[56] References Cited

UNITED STATES PATENTS

| | | | |
|---|---|---|---|
| 614,776 | 11/1898 | Stocker | 202/163 |
| 1,481,723 | 1/1924 | Merz | 159/10 |
| 1,853,330 | 4/1932 | Barstow et al. | 203/49 X |
| 2,433,741 | 12/1947 | Crawford | 55/16 |
| 2,444,527 | 7/1948 | Pomeroy | 260/412.5 |
| 2,803,589 | 8/1957 | Thomas | 159/3 UX |
| 3,248,306 | 4/1966 | Cummings | 202/234 |
| 3,358,739 | 12/1967 | Pinkerton et al. | 203/49 X |
| 3,367,787 | 2/1968 | Thijssen et al. | 159/13 C |

FOREIGN PATENTS OR APPLICATIONS

| | | | |
|---|---|---|---|
| 24,930 | 12/1956 | Germany | 159/4 K |
| 894,936 | 4/1962 | Great Britain | 159/4 K |
| 1,027,314 | 5/1953 | France | 159/DIG. 28 |
| 1,902,956 | 8/1970 | Germany | 203/49 |

*Primary Examiner*—Jack Sofer
*Attorney, Agent, or Firm*—Nilsson, Robbins, Bissell, Dalgarn & Berliner

[57] ABSTRACT

A liquid separation purification system applicable to extracting purified liquids from or concentrating solids in a liquid feed material. The system is particularly useful for extracting potable water from sea water. Cool feed liquid is pumped through the internal passages of a surface condenser section. The feed liquid leaving the condenser section, warmed by absorption of heat of condensation, is then further heated to a temperature below the boiling point of the liquid and then transferred to an absorption section. The absorption section is formed of a matrix of material which divides the liquid into a plurality of thin films. The condenser surface and absorber matrix are positioned in an insulated housing with openings between portions of the condenser and absorber. A second non-condensing fluid (gas) circulating in the absorber is saturated with part of the heated liquid on the matrix. The gas containing part of the feed fluid is circulated so that it travels toward the cooler condenser surface which strips the absorbed part of the feed liquid from the gas and precipitates it into droplets and films to fall into a collection sump for the condensate.

10 Claims, 8 Drawing Figures

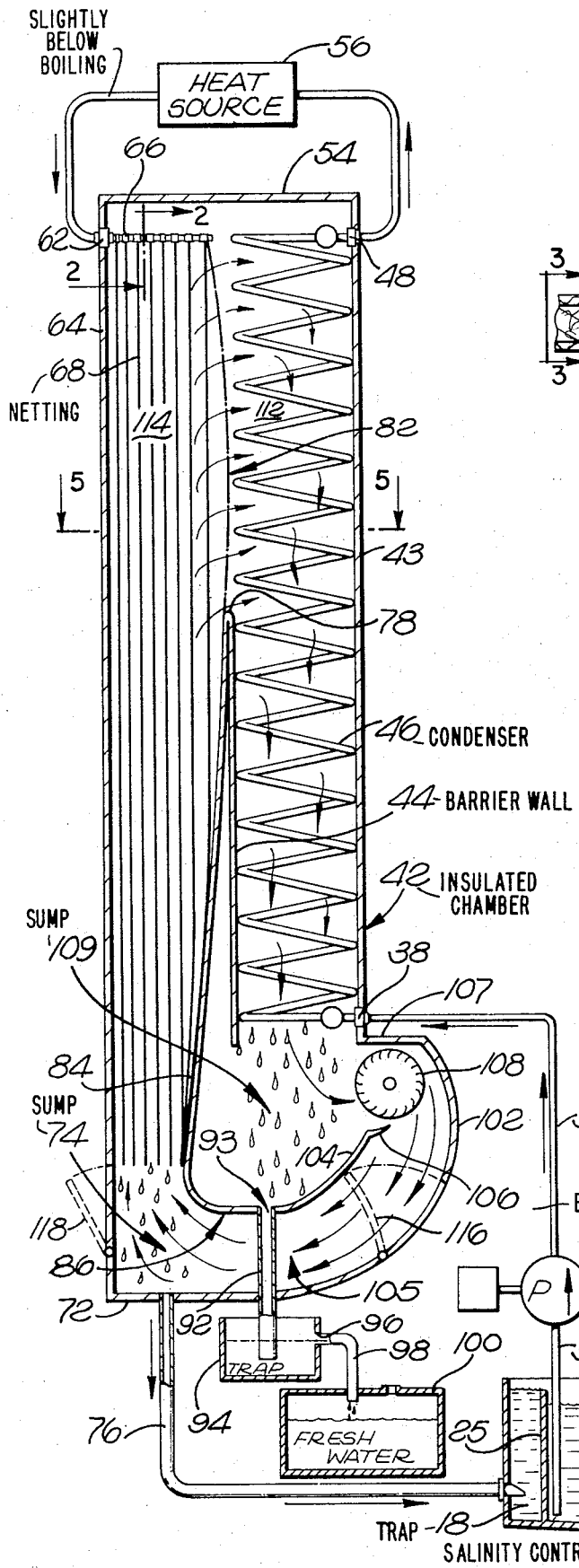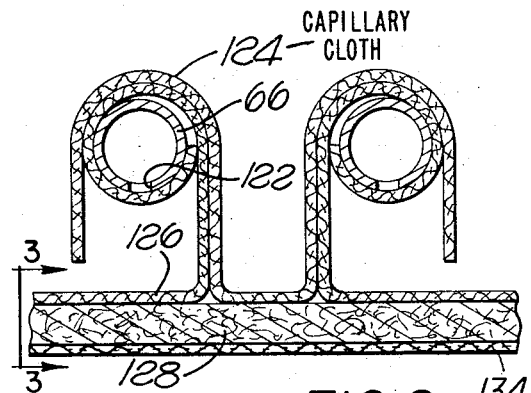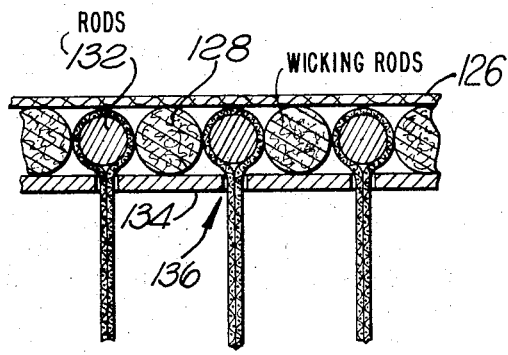

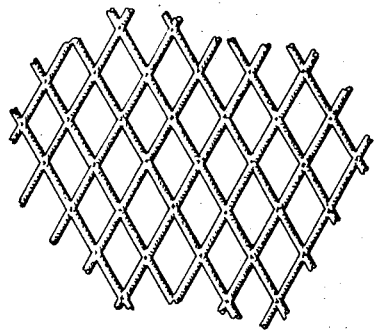
FIG.4.
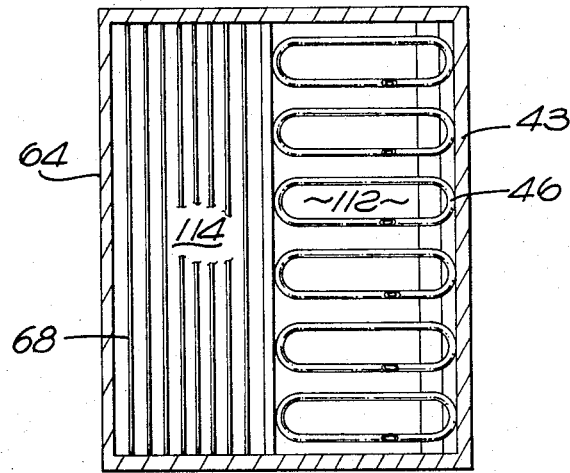
FIG.5.
FIG.6.
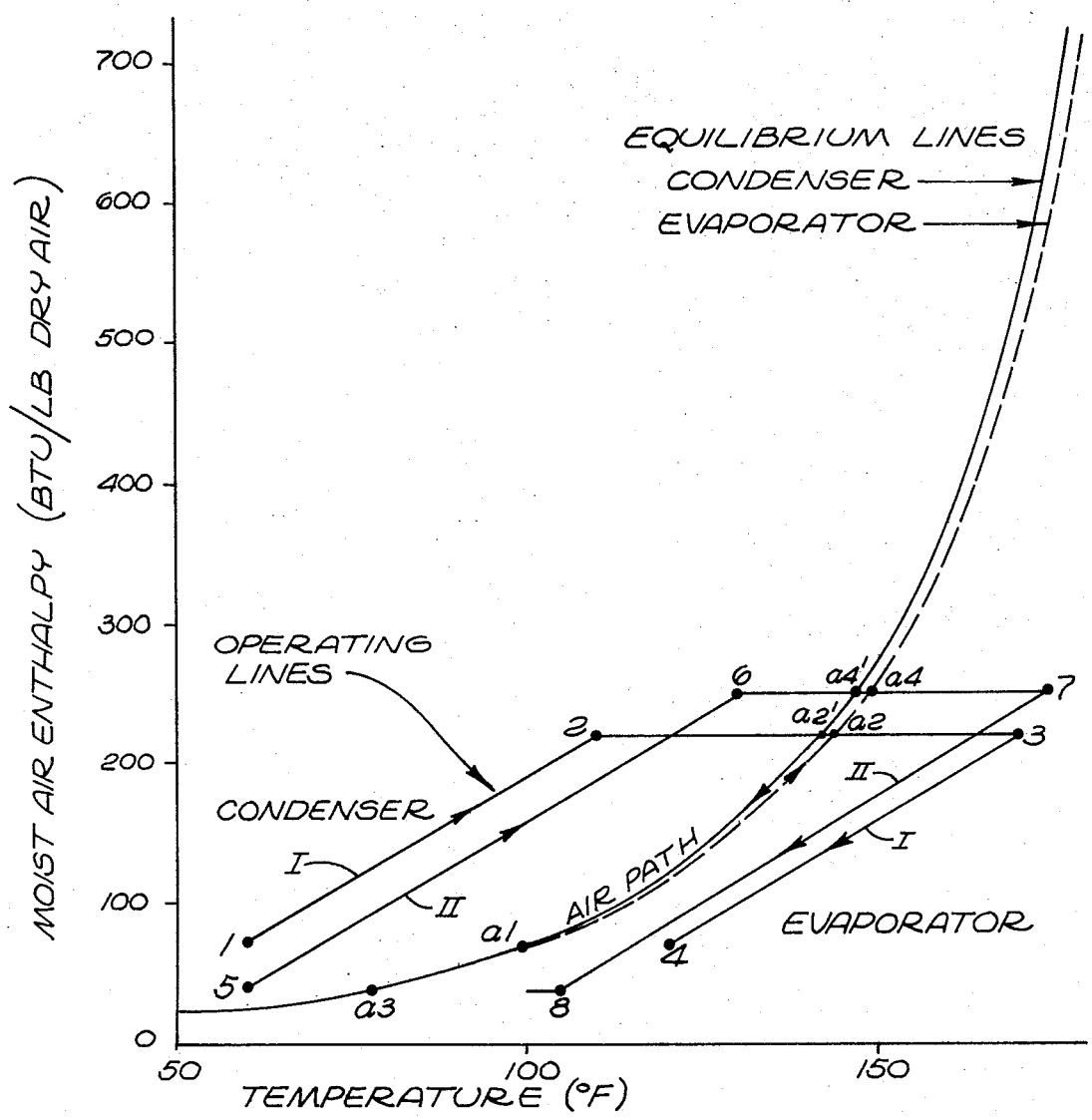

LIQUID SEPARATION SYSTEM

FIELD OF THE INVENTION

The field of art to which the invention pertains includes the field of liquid purification systems, particularly with respect to extracting pure water from an aqueous feed liquid such as sea water.

BACKGROUND OF THE INVENTION

Efficient liquid separation systems require that a minimum of energy be expended to produce a maximum of quantity and purity of output. Conventional purification techniques involve boiling or flash evaporation of the feed liquid. A number of techniques have been suggested which utilize the evaporation and transfer of fluid by a stream of gas or air and subsequent condensation, and such techniques have been suggested for producing pure water from sea water. (See for example Hill U.S. Pat. No. 3,206,379.) The Hill system uses a series of chambers providing stair step-type evaporation and cooling of an impure liquid in each chamber. While such a system is relatively efficient compared to prior art distillation type purification systems, the apparatus required to provide such a system is relatively complex. Due to the numerous chambers involved, the chances of breakdown of the system in each one of the stage chambers increases.

Known prior art includes U.S. Pat. Nos. 102,633; 236,940; 614,776; 1,101,001; 1,225,226; 1,277,895; 1,338,644; 1,489,009, 1,493,756; 1,541,789; 1,946,184; 2,018,049; 2,095,578; 2,342,201; 2,368,665; 2,375,713; 2,424,142; 2,444,527; 2,480,659; 2,616,839; 2,680,437; 3,317,406; 3,214,351; 3,311,543; 3,248,306; 3,206,379; 3,223,596; 3,471,373.

The present invention overcomes the disadvantages of prior art liquid separation systems and operates with a minimum amount of input energy to purify feed liquid. The system can be used where a small, efficient, portable purification system is required. Importantly, a single chamber can be utilized. The system does not require complex equipment and can be easily be expanded to increase output of purified liquid.

In particular, cooled feed fluid is pumped into a heat exchanger, e.g., a plurality of coils, of a condenser stage of the system. The liquid is then transferred to a heating stage where it is heated and transferred to an evaporation stage consisting of a fixed bed absorption column. A non-condensible gas is then utilized in a counterflow mode to absorb the volatile constituents in the feed fluid and transfer these vapors from the absorption column to the condenser stage where the vapors are condensed and collected for use.

BRIEF DESCRIPTION OF THE DRAWINGS

FIG. 1 is a schematic illustration of the fluid purification system made in accordance with the principles of the invention;

FIG. 2 is a sectional view illustrating the liquid distributor section utilized in the system of FIG. 1 taken along the line 2—2 of FIG. 1;

FIG. 3 is a sectional view of the liquid distributor section of FIG. 2 taken along the line 3—3 thereof;

FIG. 4 is a partial plan view of an exemplary absorbing curtain of monofilament Nylon fish net utilized in the system of FIG. 1;

FIG. 5 is a cross-sectional view illustrating the insulated chamber of the system of FIG. 1 taken along the line 5—5 thereof;

FIG. 6 is a graphical representation of the enthalpytemperature characteristics of a liquid purification system used to explain the effect of thermodynamic pinching;

DETAILED DESCRIPTION

Figure 8:
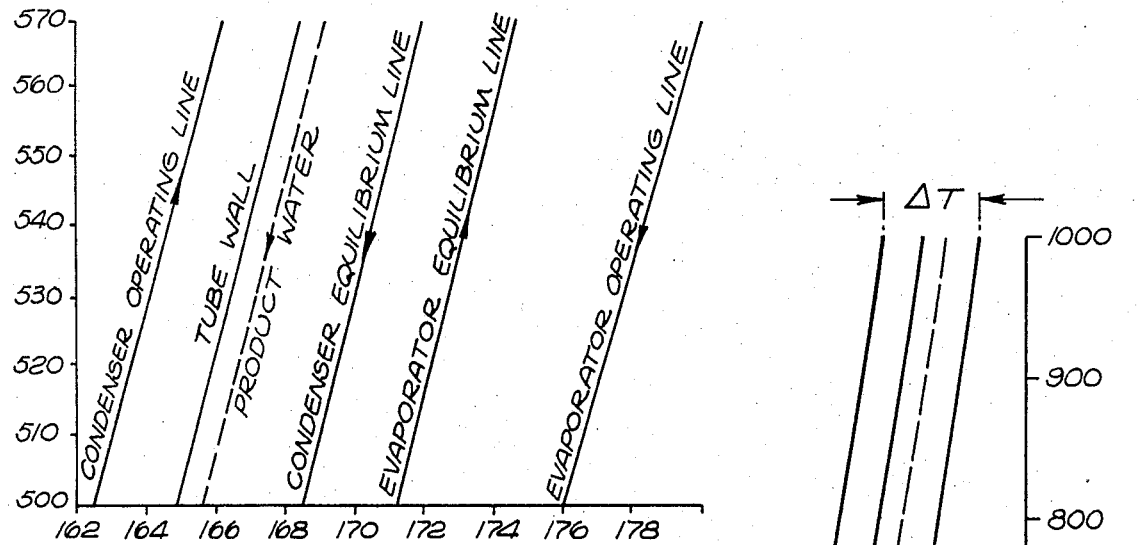
FIG. 8 is a reproduction of a portion of the graph of FIG. 7, drawn to an enlarged scale.

Although the present invention has been described with water as a feed liquid, it should be understood that the system is applicable to any liquid which can be cycled in accordance with the absorption-evaporation techniques of the present system. Also, the system is described with reference to water at a temperature just below the boiling point under atmospheric pressure. However, the system will successfully operate at lower temperatures, even as low as room temperature with subatmospheric pressure, or at higher temperatures under sufficient pressure as appropriate to maintain the heated fluid in a liquid state.

Referring now to FIG. 1, there is shown an exemplary embodiment of the combination pure liquid extraction and feed fluid concentration system made in accordance with the principles of the invention. Feed liquid, such as sea water which is to be purified and concentrated in the system, travels through an inlet pipe 12 into a reservoir 14. The inlet pipe 12 has a valve 16 (such as a float operated liquid level type) for regulating the amount of feed water to be fed into the system. The reservoir 14 also contains a trap 18 and a blowdown valve 22 (which may be controlled by a salinity controller 23) for draining the sump. The trap 18 is connected to the main portion of the reservoir 14 by means of a weir 25. Cooling coils 24 having an inlet 26 and an outlet 28 are positioned in the sump for cooling the residual liquid in the reservoir 14. The cooled residual liquid recycled with the fresh raw feed fluid is pumped from the reservoir 14 into a pipe 30 by means of a pump 32. The feed water then flows from the pump 32 into a pipe 36 and into a manifold 38 positioned on an insulated chamber 42 with side wall 43.

The central portion of the chamber 42 is divided by a transversely extending barrier wall 44 positioned in a plane parallel to the side wall 43 and contains a plurality of parallel connected condenser coils 46, on one side of the barrier wall 44, with water from the manifold 38 being distributed through the condenser coils. Typically, the condenser coils may be formed of one-quarter inch diameter coiled aluminum tubing. The water in the condenser coils 46 is pumped from the lower level input of the manifold 38 to a second manifold 48 positioned on the side wall 43 of the insulated chamber positioned near the chamber top wall 54.

The manifold 48 joins the output ends of the condenser coils 46 and the water in the coils is then removed from the insulated chamber 42 and passed through a heat source 56 which heats the water to a temperature slightly below boiling, i.e. approximately 190°F at sea level. The heated water is then coupled from the heat source 56 to a third manifold 62 positioned on the side wall 64 of the insulated chamber 42 near the top wall 54. The heated water at the manifold 62 is then distributed through a plurality of parallel pipes 66 and transferred from the pipes 66 by means of capillary action (as will be explained in greater detail hereinafter) to sheets of spaced-apart mono-filament Nylon fish netting 68.

The netting 68 hangs from just below the pipes 66 near the top of the chamber 42 and extends to a location in the chamber near the chamber bottom wall 72. An evaporator sump 74 defined between the bottom of the netting 68 and the bottom wall 72 of the chamber where unpurified water collects and is returned by gravity to the reservoir 14 by means of a pipe 76 which connects the evaporator sump 74 and the reservoir 14.

The barrier wall 44 divides the central third of the chamber 42 and terminates at top edge 78. An opening 82 is defined by the edge 78 and the chamber top wall 54. A branch wall 84 is formed at a downward acute angle with the barrier wall 44 from the edge 78 and extends downwardly toward the side wall 64 continuing as an interior bottom wall 86 spaced above the chamber bottom wall 72. The branch wall 84 causes the netting 68 to be bunched together near the evaporator sump 74.

Purified water which is formed in the chamber collects at the interior bottom wall 86 and is transferred by means of a pipe 92 which forms an opening 93 in the interior bottom wall 72 into a trap 94. The trap 94 contains an opening 96 in the side wall thereof from which an outlet pipe 98 is used to drain off the purified water into a fresh water reservoir 100.

The side wall 43 of the insulated chamber 42 terminates below the manifold 38 and a curved side wall portion 102 extends outwardly and is curved and forms a continuation of the chamber bottom wall 72. The interior bottom wall 86 is integral with an upward extension curved portion 104 parallelling the curved side wall portion 102 so that a fluid path 105 is defined between the interior bottom wall 86 and the chamber bottom wall 72 as well as the extension curved portion 104 and the side wall portion 102. The interior bottom wall 86 and curved extension portion 104 defines a condenser sump 109 thereabove and below the condenser coil 46.

The extension curved portion 104 of the wall terminates at a baffle 106 which is spaced from the junction of the side wall 43 and a horizontally formed wall 107 which interconnects with one end of the curved side wall portion 102 and the lower end of the chamber side wall 43. Spaced directly above the baffle 106 is a tangential blower 108 which causes air to flow from the bottom of the condenser coil 46 through the fluid path 105 in a direction shown by the arrows in FIG. 1 and upwardly into the chamber 42 past the netting 68. Note that the blower 108 can be omitted and natural circulation relied upon for the air flow; however, some reduction in performance can result.

The barrier 44 extends across the width of the chamber 42 so as to divide the chamber into a condenser cooling section 112 formed of the coils 46 and an absorption section 114 formed of the netting 68 as can be seen in FIG. 5. The heated water which is transferred to the netting 68 travels downwardly along the netting as the fluid in the system, normally air, is passed through the path 105 and upwardly between and through the netting 68.

The circulated air becomes saturated with the hot water vapor and travels so saturated through the opening 82 and into the cooling section 112. The saturated air is cooled in the cooling section and fresh water is precipitated therefrom into the condenser sump 109 downwardly toward the interior bottom wall 86 whereupon it passes out through the pipe 92 into the trap 94. Simultaneously, the circulated air passes back through the cooling section 112 to the blower 108 where it is recirculated through the path 105. In place of air as a circulating medium, it should be understood that other gaseous fluids which will absorb water can be used in the system when the system is closed with respect to the gaseous material.

By leaving a large vertical opening 82 between the netting 68 and the cooling coils 46 at the top half of the chamber, automatic continuous and progressive bleeding at that region occurs as air will travel through the absorption material into the cooling coils along the height of the opening 82. Since the water cools as it travels down the netting 68, a narrower contact region is provided near the bottom of the opening 882 where more restricted contact with the air is needed to aid in saturating the cooler air with cool water. A wider contact region is provided with the air returned from the top of the netting 68 as the netting bows outwardly towards the condenser section 112. In place of the single opening 82, one can interpose a plate with perforations or with horizontal (or vertical) slots, or a louvered plate, or the like, depending upon the nature of the fixed bed material, particular parameters desired, type of condenser surface, all in furtherance of optimization of a particular system configuration.

If a maximum concentration of the feed fluid is desired, the fluid path 105 can be blocked and the curved side wall portion 102 can be opened for exhaust to the atmosphere by opening a first door 116 as shown in dotted lines. The door 116 is integrally formed with the wall portion 102 and a second door 118 in the lower portion of wall 64 can be opened (as shown in dotted lines) so that the blower 108 admits fresh air into the system at the bottom of absorption section 114. Thus, the opening of the first door 116 and the second door 118 increases the heat rejection capacity of the system by admitting fresh air into the system.

Furthermore, it can be seen from FIG. 1 that the system can function satisfactorily to extract purified liquids without the use of a reservoir 14, cooling coils 24, a blowdown valve 22, a make-up valve 16 or a pump 32 with the inlet pipe connected directly to the manifold 38.

Obviously, the doors 116 and 118 as well as the pump 32 and the cooling coil 24 can be modulated to any degree separately or together to accomplish maximum performance for any combination of purified liquid extraction and feed fluid concentration.

In addition to the overall counterflow arrangement of the absorption section 114, multipass cross-counter flow can be obtained by reorienting the netting 68 perpendicular (edgewise) to the above mentioned slotted plate, and placing a multiplicity of horizontal baffles, slotted so as to mesh with the netting of curtains, to form a series of cross-baffles for guiding the vapor flow in a multipass cross-counter flow path through the netting without impeding the vertically falling liquid films.

Vapor bleed flow from the absorption section 114 to the condenser section 112 takes place via the slots in the vertical plate at selected locations where the interpass vertical portion of the vapor flow path is adjacent to the slotted plate. By these means, additional control of vapor bleed and internal distribution in the absorption section can be obtained.

Referring now to FIG. 2, there is shown the interconnection between the manifold 62 and pipes 66 which transfer the heated water to the netting 68. The pipes 66 are all connected in parallel in a plane parallel to the top wall 54 of the insulated housing. Openings 122 are formed at the lower surface of the pipes which enable water to leak out of the pipe and spray downwardly. Capillary cloth 124 surrounds the outer surface of each pipe. The capillary cloth 124 saturates with water which is transferred to a flat portion 126 formed in a plane parallel to the pipes and directly therebelow.

Referring now to FIG. 3, a plurality of wicking members 128 is illustrated positioned directly below the flat portion 126 and are formed in a plane parallel to the pipes 66 but extend transversely thereto. The wicking members 128 are interspaced with a plurality of support rods 132 which extend in the plane of the wicking members. The wicking members 128 and support rods 132 are supported by means of a support plate 134 which contains a plurality of openings 136 directly below each of the support rods 132.

The exemplary embodiment of the netting 68, illustrated in FIG. 4, is formed of a monofilament Nylon fishnet of diamond-shaped configuration and is hung on support rods as a group of parallel curtains with each curtain extending through the opening 136 downwardly toward the reservoir 74 as illustrated in FIG. 1 in planes generally parallel to the condenser section. Alternatively, the netting can be hung perpendicularly (edgewise) to the condenser section 112 (not shown). In a third configuration, the netting can be cut in the transverse direction and hung as a multiplicity of coiled strands (not shown). In the latter two cases, the netting would not bow outwardly as in the arrangement of FIG. 1. The netting 68 is knitted, containing no knots therein so as to enable the heated water to flow as a uniform film along each thread in every curtain toward the reservoir 74. Thus, heated water is transferred from the pipe to the capillary cloth 124 and then to the wicking members 128 which in turn transfer the heated water to the netting. Additionally, the heated feed water flows into the flat portion 126 of the capillary cloth as the portion of the capillary cloth 124 surrounding the pipes 66 saturates. The wicking members 128 are normally highly capillary and formed of a hydrophylic plastic fiber cord material which acts as a liquid conductor. Suitable for use as the Nylon fishnet is U.S. Net and Twine material, Stock No. 4, having one inch stretch mesh, 144 meshes deep, and made of single knot (knitted) virgin monofilament Nylon material.

Referring now to FIG. 5, there is shown a horizontal cross-sectional area of the chamber 42 taken along the line 5—5 of FIG. 1. Each of the nets 66 extends across the width of the chamber. By making the chamber wider, additional netting material of wider width can be utilized. In addition, by use of a plurality of parallel coils, additional coils 46 can be added in parallel should it be so desired.

Referring now to FIG. 6, the thermodynamic processes involved in a water purification system can be described by means of an equilibrium line-operating line diagram which is plotted with the enthalpy (heat content) of a saturated mixture of air and water vapor as a function of temperature. In FIG. 6, operation of the water purification system is illustrated for an air-water system such as utilized in the purification of salt water at one atmosphere pressure. The equilibrium line illustrates the thermal energy content of moisture saturated air plotted against water temperature. Two equilibrium lines are shown; the solid line illustrating the case where saturated air over pure water occurs in the condenser section, and the dotted line illustrating the case where saturated air over salt water exists in the evaporator section. The operating lines depict energy balances between the water and air streams in the condenser section and the evaporator section. The example uses a water flow rate three times that of the air flow rate in the system.

In the first example, illustrated by operating line I, feed salt water enters the condenser coils at 60°F (point 1 of FIG. 6) and exits the condenser coils at 110°F (point 2). The water is then heated to 170°F (point 3) where it then enters the evaporator section. When the water leaves the evaporator section, it has cooled to a temperature of 120°F (point 4).

Simultaneously, air flow from the bottom of the evaporator section at 99°F (point $a1$) leaves the evaporator at 143°F (point $a2$) where it enters the condenser section. As the air flows over the condenser coils it is cooled again to 99°F (point $a1$) and returned to the lower end of the evaporator by a fan. Water is absorbed by the air in the evaporator section and removed from the air in the condenser section. The performance of the design illustrated by operating Line I is approximately as follows:

Ratio of fresh product water to salt feed water = 0.041;

Number of effects = 0.76

The number of effects is defined as the ratio of the energy required to boil a unit mass of pure water to steam at one atmosphere, starting with a liquid at 60°F, to the energy required by the process to produce the same amount of pure water.

In a second example, illustrated by operating line II, performance was improved by making the unit twice as long. As a consequence, the operating lines are closer to the equilibrium lines, with the result of improved performance. For the second example, the product water to feed water ratios is 0.058 and the number of effects is 1.47. Any further increase in size, or more accurately, the number of transfer units, would not result in a significant increase in performance because the operation lines would then be too close to the equilibrium lines at a local point. This effect is called the thermodynamic pinch effect. For the two design cases illustrated in FIG. 6, the operating lines for the condenser would eventually pinch at the water inlet and the operating lines for the evaporator would pinch somewhere intermediate thereof.

An alternative design for circumventing the pinching effect can be accomplished by changing the slope of the operating lines. By reducing the water flow or alternatively increasing the air flow, the ratio of water to air flow can be made equal to unity. However, the limiting effects of thermodynamic pinching will again be noticed.

A solution to the pinch problem would be to start a very low ratio of liquid flow to air flow and gradually bleed air from the evaporator into the condenser. In this way, the operating line can be made to follow the equilibrium line without pinching occurring. This solution requires careful control of the bleed air flow which is an advantageous feature of the effective water purification by means of the present system.

The performance of an eight stage design is substantially better than a single stage design described with respect to FIG. 6. With an eight stage design, the product feed water ratio is 0.093 and the number of effects is 5.20. Thus, for every pound of fresh water produced 10.7 pounds of feed water is required, and 9.7 pounds of brine is rejected. The corresponding thermal energy input would be 215 BTU's per pound of fresh water produced. A small additional amount of energy is required for pumping power.

When the concentration of dissolved solids in the feed fluid is high as a result of either the extraction of purified fluids and recycling the residual or from the use of an intially concentrated feed fluid such as sea water, the evaporator equilibrium line is lower (less energy per unit mass of dry air). The water vapor pressure over the the more concentrated feed fluid is less because of the presence of more dissolved solids in the fluid. As a consequence, the operating lines will tend to separate requiring an increase in the heat input or increase in the evaporator size (number of transfer units) to maintain the same output.

A fundamental feature of multi-stage water purification is the method of controlling the air bleed from the evaporator into the condenser by effecting a bleed differential between the top and bottom of an opening formed in a divider plate between the condenser and evaporator. In the case of a discrete number of stages such as an eight state design, bleed flow control may be obtained with a slotted or perforated divider plate between the evaporator and the condenser. Continuous staging where the operating lines are smooth curves that follow the equilibrium lines may be obtained by using a more compact packing at the face of the evaporator. In essence, the resistance to flow in the evaporator can be varied so that the desired bleed air flow control is inherently obtained. In designs utilizing the continuous staging, the curtains of fishnet in the evaporator section are spaced closer together at the edge facing the condenser than in the center thereof so as to obtain a further regulation of the bleed flow.

Figure 7:
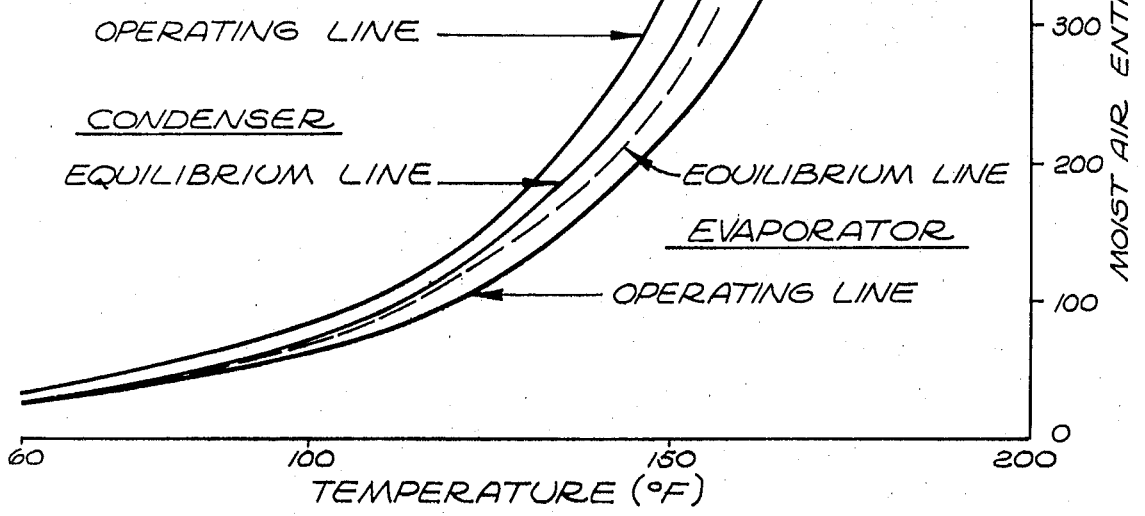
FIG. 7 is a graphical representation of the enthalpytemperature characteristics of a liquid purification system having an continuous bleed, semi-infinite stage transfer of a saturated gas from the evaporator section to the condenser section of the system.

FIG. 7 illustrates an equilibrium line operating line diagram for a continuous bleed, semi-infinite stage design. With a sea water feed this design, which is illustrated in FIG. 1 is thermodynamically ideal. The product water and condenser tube wall temperatures are also shown in FIG. 8, which is an enlarged view of one porition of FIG. 7. The overall performance of the system operating at the conditions shown in FIG. 7 is a product to feed water ratio of 0.10 and a number of effects of 8.5. Greater concentration of the sea water feed and a higher product to feed water ratio can be achieved by recycling the concentrated brine (which lowers the evaporator equilibrium line, and separates further the operation lines) and by adding more thermal energy.

In the case of other solutions which are to be concentrated with corresponding production of pure water, the performance of a system will depend on the dissolved substance's solubility and the vapor pressure over the solution. Carrier mediums other than air, (such as helium and hydrogen) may also be used. Mixtures of helium and oxygen also have certain heat transfer and pumping power advantages. Pressure levels other than one atmosphere (both higher and lower) are permissable.

The magnitude of the pressure change within the unit is a function of the air flow rate, the temperature, the rate of phase change (evaporation and condensation), the rate of molecular weight change and the frictional and drag characteristics of the evaporator packing and condenser coils. The bleed flow is proportional to:

$$(m\Delta P/T)^K$$

wherein;

$m$ is the molecular weight of the air-water vapor mixture;

$\Delta P$ is the pressure differential between the evaporator and the condenser; and $T$ is the temperature of the air-water vapor mixture at the location where bleed flow was taking place.

The exponent $K$ is 0.5 for turbulent flow and 1.0 for laminar flow. By careful design and experiment the bleed flow can be controlled either directly by using slotted or perforated plates or automatically by using variable packing in the evaporator section.

The use of compressed packing (variable area) near the bottom of the evaporator, prior to bleeding of the air flow, is helpful to provide uniform flow in the evaporator packing and to help bring the operating lines closer to the equilibrium lines (by increasing the number of transfer units.)

When the design illustrated in FIG. 1 is operated with an open vapor circuit so as to induct fresh air into the system, and the feed water contains organic components, the oxygen in the fresh air could be utilized to bio-oxidize the organic components contained in the fluid being distilled.

The netting 68 can not only function as an absorption medium but also as a means for supporting a biological culture as well. Thus, the netting can serve as a trickling filter medium allowing excess culture growth to slough off into the sump 14 through the pipe 76 connected to the evaporator sump 74 to be settled and separated as a solid. The supernatant can be recycled into the system as usual. Of course, any specially prepared cultures can be utilized to enhance the results of bio-oxidation.

While the system has been illustrated as utilizing an external coolant in the sump cooling coils 24 to augment the cooling by the condenser coils 46 and an external heat source 56 which further heats the cooled water from the condenser, it should be understood that the system can be made to operate without these additional external heating and cooling means by utilizing a condensing unit as the heat source 56 and an evaporator unit as the sump coil 24, these being components of a vapor compression refrigeration system and comprising a closed heat pump. Thus, the only energy input required would be to drive the refrigerant compressor (not shown), fan 108, and the feed pump 32. Such an integrated thermodynamic system could further reduce energy requirements by at least two thirds.

The foregoing has described a unique system having a number of advantages over prior systems. Thus, all liquid flow is by gravity or via capillary action and the liquid takes the form of thin films in the regions of mass exchange. Accordingly operation of the system conserves pumping power, enables a high degree of separation, and provides a high degree or surface contact, all in a simple vessel which can be physically expanded or contracted to suit particular requirements.

I claim:

1. A vapor staging distillation system for separating liquid from feed material, yielding a concentrate and a condensate comprising:

a vertically extending divider wall;

a vertically extending evaporation section on one side of said divider wall;

a vertically extending condenser section on the other side of said divider wall;

cooling means for condensing vapor in said condenser section;

means for transferring said feed material to said evaporation section at a temperature higher than said cooling means;

means in said evaporation section for providing a plurality of vertically extending thin films of liquid from said higher temperature feed material;

means for conveying a gas stream in cyclic flow from said condenser section to said evaporator section and back to said condenser;

said divider wall having an opening in the top portion thereof appreciable vertical extent, said evaporator and condenser sections communicating directly through said opening whereby vapor from said films in said evaporation section is conveyed by said gas to said condenser section to effect a bleed differential between the top and bottom of said opening;

means for collecting condensate from said condenser section; and means for collecting concentrate from said evaporation section.

2. A system in accordance with claim 1 wherein said cooling means comprises a plurality of coils defining a flow path for said feed material.

3. A system in accordance with claim 2 wherein said transferring means comprises a heat source for heating said feed material from said cooling means to a temperature near but below the boiling point of said liquid.

4. A system in accordance with claim 3 wherein the means for providing thin films in said evaporator section includes flexible, vertically extending curtains of netting forming a fixed bed absorption column, said transferring means comprising means for feeding said feed material to the top of said netting to form said thin liquid films.

5. A system in accordance with claim 4 wherein said netting is formed of monofilament Nylon fish net curtains.

6. A system in accordance with claim 4 wherein said netting forms a means for supporting a biological culture.

7. A system in accordance with claim 4 wherein said means for feeding material comprises at least one horizontally extending conduit connected to a source of said feed material, said conduit defining openings therethrough, and including capillary means contiguous with said conduit openings and with the top of said netting whereby said feed material is conveyed from said conduit openings to said netting.

8. A system in accordance with claim 4 wherein said condenser coils and said netting are housed in an insulated chamber.

9. A system in accordance with claim 8 wherein said opening is substantially uninterupted to provide continuous gas and vapor transfer.

10. A system in accordance with claim 8 wherein said divider wall is formed to bunch said netting at the bottom portion thereof whereby said netting bows toward said condenser section through said divider wall opening.

* * * * *